March 25, 1958  I. H. CHAYEN  2,828,018
RECOVERY OF FAT FROM FAT CONTAINING MATERIAL
Original Filed July 18, 1951  3 Sheets-Sheet 1

Inventor
ISRAEL HARRIS CHAYEN

March 25, 1958 I. H. CHAYEN 2,828,018
RECOVERY OF FAT FROM FAT CONTAINING MATERIAL
Original Filed July 18, 1951 3 Sheets-Sheet 2
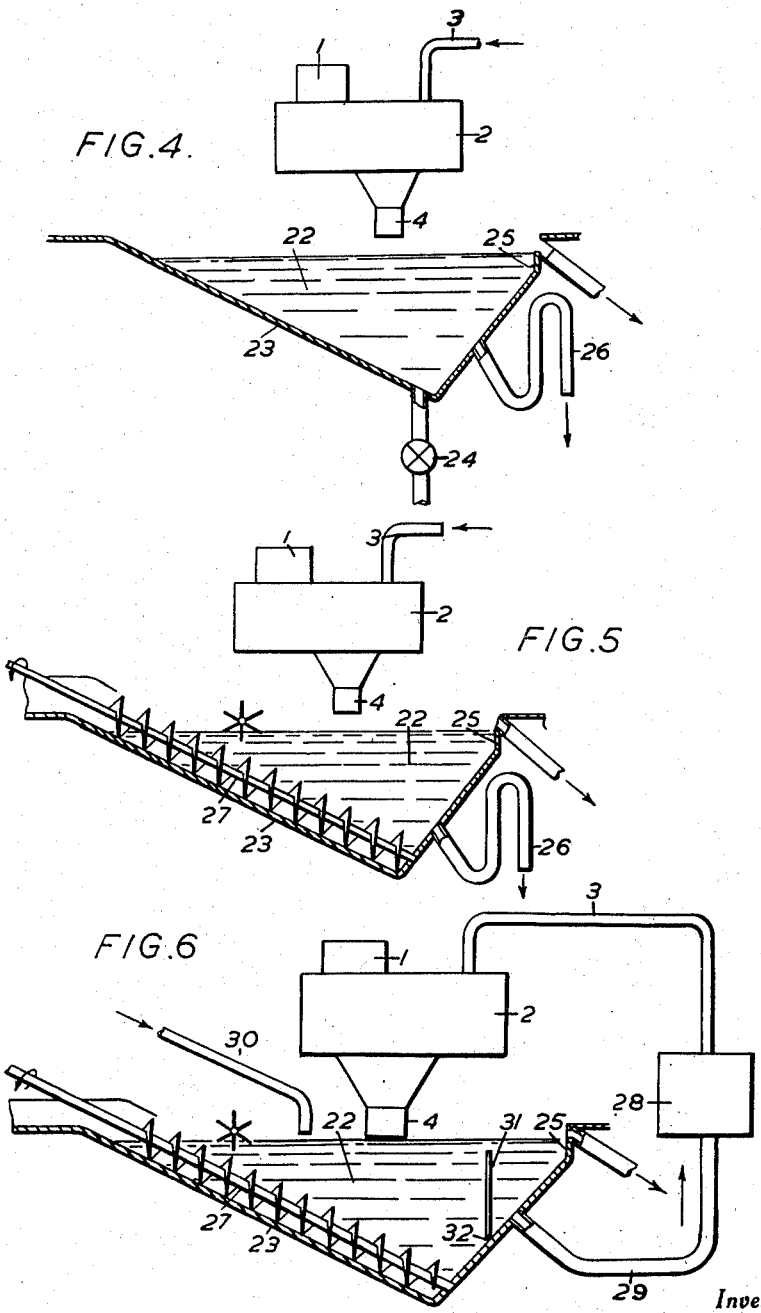
Inventor
ISRAEL HARRIS CHAYEN March 25, 1958     I. H. CHAYEN     2,828,018
RECOVERY OF FAT FROM FAT CONTAINING MATERIAL
Original Filed July 18, 1951     3 Sheets-Sheet 3
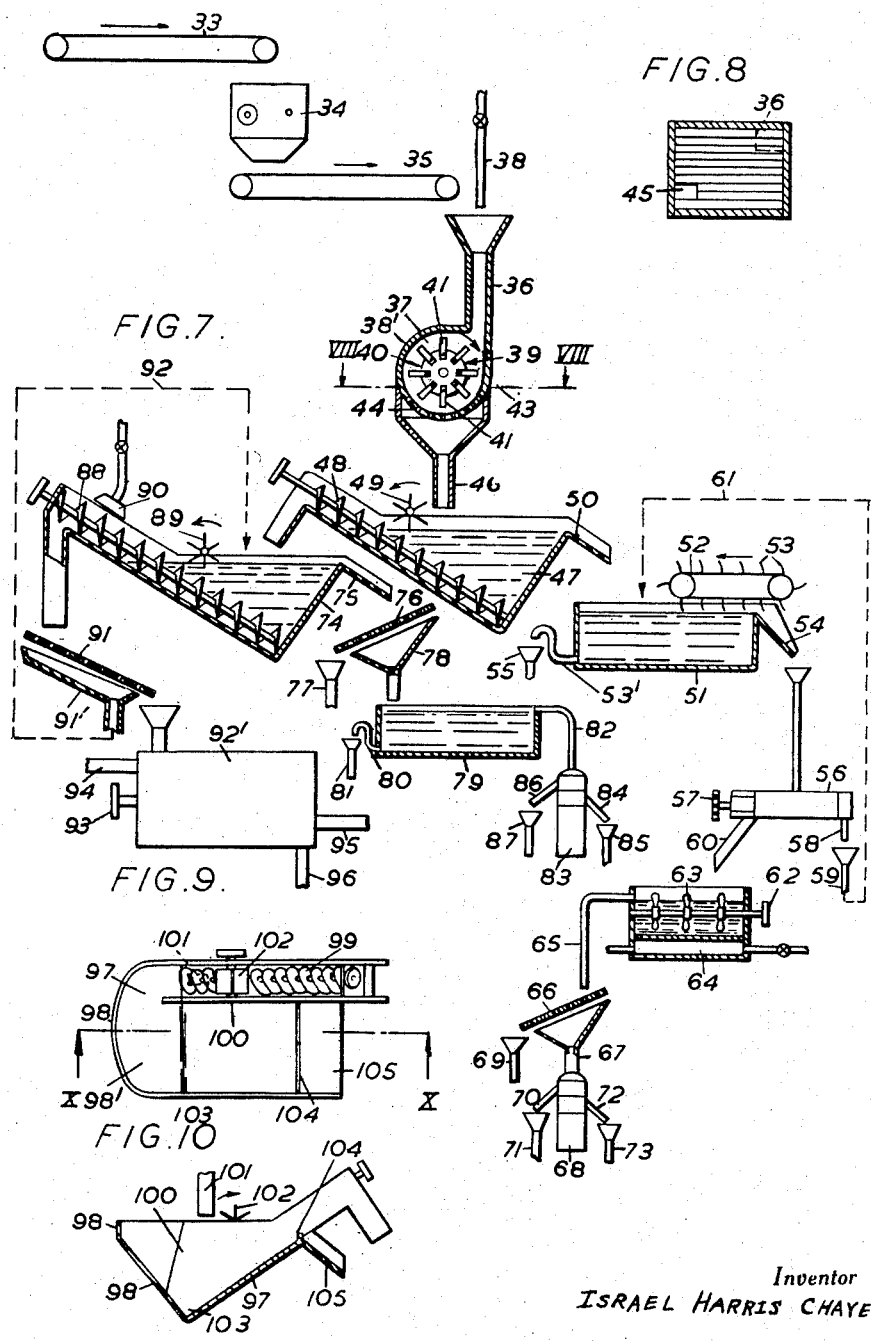
Inventor
ISRAEL HARRIS CHAYEN United States Patent Office 2,828,018
Patented Mar. 25, 1958

2,828,018

RECOVERY OF FAT FROM FAT CONTAINING MATERIAL

Israel Harris Chayen, London, England, assignor, by mesne assignments, to C. C. D. Processes (N. Y.), Limited, New York, N. Y.

Original application July 18, 1951, Serial No. 237,327, now Patent No. 2,635,104, dated April 14, 1953. Divided and this application November 26, 1952, Serial No. 322,713

6 Claims. (Cl. 210—152)

This invention is concerned with improvements in and relating to the recovery of fat from fat containing materials and is particularly useful for the recovery of high yields of higher quality fats from such materials as bones, suet, gut fat and fat-containing meat than has been possible by prior processes.

Although the process is applicable to substantially all fat-containing materials it was developed as an improvement in the degreasing of bones and the description of the process will be primarily directed to that operation.

The degreasing of bones is an important industrial operation, which is widely carried out, and the main purposes of which are firstly, to extract the maximum amount of fat, in a salable form and in the most economic manner compatible with the quality desired, and secondly, to prepare a degreased bone having as low a content of fat and offensive organic impurities as possible and from which high quality glues and feeding meals or fertilizers can be produced. The degreasing operation is generally carried out by one of three processes known as dry rendering, wet rendering and solvent extraction. The use of each of these processes is, like the processes themselves, well-known to those skilled in the art to be attended with various disadvantages, some of which may here be briefly mentioned.

Dry rendering involves heating the bones in the presence of hot fat for periods of up to four hours which treatment tends to discolor the fat and to have a very deleterious effect on the collagen or glue-making material contained in the bones, sinew and periosteum. A further disadvantage is the high proportion of fat left in the bones which is seldom less than 8% of the weight of the treated bones.

In wet rendering, the bones, either with or without previous steam heating, are either simmered in hot water for periods of the order of from 5–8 hours, or digested for similar times with hot water and steam under pressure. The simmering process, when applied, for example, to fresh butcher's bones containing 16% of fat, will generally extract about 10% of fat, the remainder being left in the bone. The prolonged simmering treatment has an adverse effect on the collagen, and the quality of the fat is also adversely affected by the prolonged heating. The digester process gives a somewhat higher yield of fat, but the damage to the collagen is somewhat greater. Glues and bone meals produced from wet rendered bones are inferior in quality to those produced from solvent extracted bones.

The maximum known fat extraction is obtained by the solvent extraction process, in which the bone, usually after crushing, is subjected to the hot vapor of an organic fat solvent, the extracted fat and condensed solvent vapor being run off into stills and the fat recovered by distilling the solvent from it, while the vapor in the bone is driven off by steam. When using this process, for which a typical time is 22 hours, the fat yield from a typical butcher's bone of 16% fat content can be as high as 15% on the bone. The principal disadvantages of this process are the high capital cost of the necessary plant and the high fuel cost for operating it, the dangers from fire and toxicity of the solvents used, and the adverse effect of prolonged heating and solvent contamination on the fat and on the bones. Also, some of the fat is recovered in a tight emulsion with water and a difficult emulsion breaking operation must be carried out.

It will be noted that all of these processes are discontinuous or batch processes in which both the bones and the fat are exposed to heat for prolonged periods, with the adverse effects to which reference has been made, while the discontinuous nature of the processes, and the prolonged heat treatments, increase their cost.

An object of the present invention is to provide an improved method of and means for degreasing bones which avoids the aforesaid disadvantages and which is adapted to be carried out as a continuous process.

Also many other animal fat-containing by-products, such for example, suet, gut fat and fat-containing meat, have to be treated for the separation from them of the contained fat, and this is an important industrial operation, which is carried out in many parts of the world.

The method most generally used is that of hot rendering in which the material is heated in steam-jacketed vessels, generally fitted with paddles or the like to break it up during the heat treatment. When the rendering is complete, the free fat is run off from the denatured meat or protein which is often termed greaves. These greaves generally contain about 30% of their weight as fat, which figure can be reduced to from 12%–20% by centrifuging while hot. Sometimes, especially where the amount of greaves is relatively large, it is considered desirable still further to reduce their fat content, in order to render them suitable for use as animal feeding stuffs, and this is usually done by a hot solvent extraction process, or by the use of expellers.

These processes are tedious, expensive and not very efficient, and the capital cost of the plant required is high. Moreover, the processes are all discontinuous or batch processes and the temperatures employed and the time required for the heat treatment have an adverse effect on the quality of the fat.

Another object of the present invention is to provide a new and improved method of recovering fat from animal fat-containing products other than bones, which avoids the aforesaid disadvantages, and which is adapted to be carried out as a continuous process.

With respect to the degreasing of bones, the invention is based on the discovery that if fat-containing bones in a disintegrated condition are subjected to intense impacts or percussive blows in the presence of water, which may be and preferably is at room temperature, the membranes which protect the fat cells in which the greater part of the fat is contained can be disrupted, thus setting free the fat which may be readily separated in the form of a mixture of water and fat having a butter-like consistency. The mixture can be readily separated into fat and water, and the fat recovered. That is to say, the fat associated with some water will rapidly rise to the surface of the water in a settling operation, leaving the major portion of the water as a lower substantially fat-free layer. The disintegration of raw (i. e., fat-containing) bones by the intense impacts above described is difficult and inconvenient unless it is effected in the presence of a liquid, preferably water. I prefer to carry out the improved process in such a way that the bones are disintegrated while in the presence of and subject to the force of a vigorously moving body of water, preferably at ordinary room temperature.

While I do not desire to be limited to the use of any particular type of plant, I have found that a convenient way of carrying out the new process as a continuous one is continuously to feed rough, crushed bone into a rapidly rotating hammer mill of any suitable design together with a quantity of water, preferably cold, which is several times that of the bones. The disintegrated bone and water are continuously discharged through one or more suitably dimensioned gratings into a separating vessel containing cold water, the bone being allowed to fall through the water and being continuously removed from the bottom by mechanical means such as a worm. The fat still associated with some water separates on the top of the water, from which it is continuously removed in any convenient way, as—for example—by being allowed to flow over a weir for collection and for separation of the fat from the water.

I have found that, starting with raw, rough crushed bones, having a fat content of from 12%–20%, the wet bones discharged from the worm in the separating vessel generally contain only from 3–5% of fat, calculated on the dry weight of the treated bone.

The greater part of this residual fat can easily be separated from the bones and recovered by one or more further simple and similar treatments to be described.

Another object of the invention is, therefore, to provide a method of degreasing bones in which bones in a disintegrated condition are subjected to intense impacts while surrounded by a body of preferably cold water, after which they are allowed to settle in preferably cold water from which the treated bones and the fat which rises to the surface of the water are separately removed.

Another object of the invention is to provide a method of degreasing bones in which preferably rough crushed bones are disintegrated by percussive blows in the presence of a body of vigorously moving and preferably cold water, after which they are allowed to settle in preferably cold water from which the treated bones and the fat which settles on the surface of the water are separately removed.

Another object of the invention is to provide a process for degreasing bones in which preferably roughly crushed bones are fed into a disintegrator mill, preferably of the rapidly rotating hammer-mill type and are there disintegrated in the presence of a quantity of preferably cold water, sufficient to keep the bones submerged, whereby the bones are disintegrated into small pieces while being subjected to the force of a vigorously moving body of water, the disintegrated bones and water being discharged into a separating vessel preferably already containing cold water, the bones being allowed to fall through the water to the bottom, from which they are removed while the fat which separates on the surface of the water is separately removed.

Another object of the invention is to provide a process of degreasing bones which is carried out as a continuous process, the bones and water being continuously fed to and discharged from the disintegrator mill while the disintegrated bones are continuously removed from the separating vessel and the fat which separates on the surface of the water is continuously removed therefrom.

Another object of the invention is to provide a process of degreasing bones in which the disintegrated bones removed from the cold water separating vessel are treated in another separating vessel containing hot water, through which the bones are allowed to fall to the bottom, from which they are removed, the fat which separates on the surface of the water being also removed.

The optimum time for which the disintegrated bones are subjected to the force of the vigorously moving water should be determined for a given kind of bone in order to ensure that the maximum fat extraction coupled with a suitably-sized disintegrated bone is obtained. When the bones are disintegrated in the presence of the vigorously moving body of water, the time of this treatment should be adjusted to give a maximum fat extraction together with a suitable size of bone particle, using any particular disintegrator. The time of treatment will depend on the origin and state of the bones before treatment, for example, the fat content, age, hardness and animal from which they are derived and the purpose to which the degreased bone is to be put.

In accordance with the present invention, I have also found that if soft fat products such as suet, gut fat and fat-containing meat, for example, knacker meat and offal, are subjected to a treatment which ruptures the membranes of the fat-containing cells, such as the intense impacts or percussive blows described above while the soft fat is in the presence of water, the fat will be released from the cells and will form a mixture of water and fat which can easily be removed from the major portion of the water and readily separated. As in the recovery of fat from bones, it is preferred that the cell membrane-rupturing operation should be carried out in the presence of a relatively large volume of vigorously moving water, preferably cold water. Although I do not desire the invention to be limited in this respect, I at present also prefer to carry out this operation in a high speed rotary swing beater mill, into which the soft fat products are fed, preferably continuously, together with a relatively large volume of preferably cold water, and from which the said products and water are discharged, preferably continuously, through suitably dimensioned gratings into a separating vessel containing cold water, on the surface of which the mixture of water and fat separates, and from which it can easily and continuously be removed. The solid residue which settles in the vessel may be collected, either a continuously or intermittently and may be further treated or utilized as desired.

The fat content of the soft fat products may vary within wide limits; thus suet can contain as much as 85% of fat and in exceptional cases even more; and very little residue, while in the case of some fat-containing products the fat content may be as low as 15% or even lower, while the residue will be relatively large. It will readily be understood, therefore, that the details of the present process may be varied within wide limits without department from the scope of the invention.

The amounts of solid residues which are separated from the animal fat-containing products vary according to the nature of the product treated but in general will be small. Thus on allowing the treated products to settle in a water-containing vessel, a small quantity of residue will settle to the bottom of the vessel from which it may be removed from time to time or, if desired, continuously. It should also be noted that the fat-water mixture which rises to the surface of the water generally contains a small quantity of solid fibrous material which, however, does not enclose the fat particles and from which nearly all of the fat can readily be separated by heating as hereinafter described.

Another object of the invention is, therefore, to provide a method for recovering fat from soft fat products in which soft fat products are subjected to intense impacts to rupture the membranes of the fat-containing cells, while the products are surrounded by a body of preferably cold water from which the fat which rises to the surface is removed.

Another object of the invention is to provide a method for recovering fat from soft fat products in which the said products are subjected to treatment which ruptures the membranes of the fat-containing cells while the said products are in the presence of a body of vigorously moving and preferably cold water, and are freely suspended in, or surrounded by, such water, after which the thus treated products and water are allowed to settle, preferably in cold water from which the fat rises to the surface and, if desired, the residues are separately collected.

Another object of the invention is to provide a process in which soft fat products are fed, preferably continuously, into a disintegrator mill, preferably of the rapidly rotating hammer-mill or swing beater type, and are then subjected to the action of the mill in the presence of a body of preferably cold water, whereby the membranes of the fat-containing cells are ruptured while the material is subjected to the force of the vigorously moving body of water, the contents of the mill including the water being discharged, preferably continuously, into a separating vessel preferably already containing cold water, the residues being allowed to fall through the water to the bottom of the vessel while the fat which separates on the surface of the water is, preferably continuously, removed.

Other features of the invention will appear from the description which follows:

I will now describe in greater detail, and by way of example only, several methods of carrying out the process as well as arrangements of plant which are suitable for the purpose, with reference to the accompanying drawings, in which:

Figure 4 is a diagrammatic view of a simple plant particularly suitable for the treatment of soft fat products;

Figure 5 is a diagrammatic view of a plant similar to that of Figure 4 but in which the solid residues are continuously removed;

Figure 6 is a further modification of the plant shown in Figure 5;

Figure 7 is a diagrammatic view of a more complete plant suitable for treating either bones or soft fat products and diagrammatically showing more details of the hammer-mill;

Figure 8 is a sectional view of the hammer-mill taken on line 8—8 of Figure 7 with the rotor removed;

Figure 9 is a diagrammatic plan view of a preferred form of settling vessel; and Figure 10 is a sectional view of the settling vessel taken on the line 10—10 of Figure 9.

The process as applied to bones in accordance with Figures 1 to 3, inclusive, will first be described.

Figure 1:
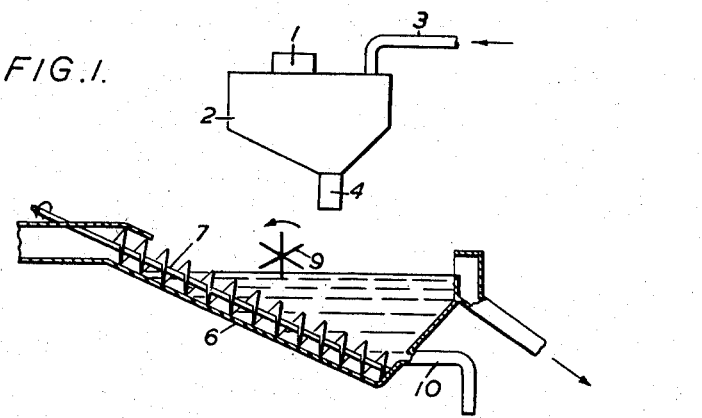
Figure 1 is a diagrammatic representation of plant suitable for carrying out the process in a simple form.

Referring to Figure 1, the bones to be degreased, which should preferably be rough crushed to pieces of from one to two inches (2.5–5.1 cms.) in size, are continuously fed into the inlet 1 of a suitable high speed pulverizer or hammer mill 2, in which they are disintegrated in the presence of a substantial volume of rapidly moving water fed through pipe 3. It has been found that a Christy and Norris No. 2½ (18" by 12") standard type swing beater mill, fitted with ¼" (6.35 mm.) grids at its discharge outlet, rotating at a speed of 2,500 R. P. M. and continuously flushed, by means of a pump (not shown in Figure 1), with cold water at the rate of 400 gallons (1820 litres) per hour, gives excellent results when continuously fed with rough crushed bones at the rate of 8 cwts. (406 kg.) per hour. The gallons referred to throughout this application are British imperial gallons.

The grids should be so chosen, having regard to the nature of the bones, as to retain the larger pieces of bone for long enough to enable the fat-protecting membranes to be disrupted while at the same time delivering the bone of a size which is suitable for glue-making or other subsequent treatment, it being noted that for some purposes too fine a bone is unsuitable.

The ground bone and water are discharged through pipe 4 into a separating vessel 5 having an inclined bottom 6 and containing cold water through which the bone is allowed to fall. The ground bone is continuously removed by means of worm conveyor 7. The fat separates and rises to the surface of the cold water as a fat-water mixture and is continuously removed by being allowed to flow over weir 8, while the paddle 9 prevents floating fat from entering the worm conveyor 7. Surplus cold water, which also contains a little fat, is removed by pipe 10.

If the separated fat-water mixture is heated to about 94–98° C. and allowed to settle, the fat separates cleanly from the water as an upper layer and can readily be removed. The lower, or water layer, contains very little fat, which is easily recoverable, if desired; but some solid matter, mainly of a protein nature, settles out and may be recovered.

It was found that when using a rough crushed butcher's bone of about 15% fat content, the wet disintegrated bone discharged by the worm 7 from the vessel 5 has a fat content of only 3–5%, calculated on its dry weight. The bones may be subjected to further treatment in various ways in order to obtain a further yield of fat.

Figure 2:
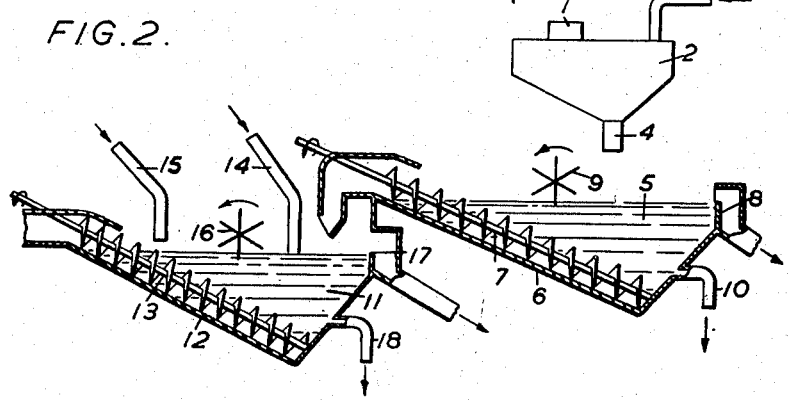
Figure 2 is a diagrammatic representation of plant employing hot and cold separators particularly suitable for the treatment of bone.
Figure 3:
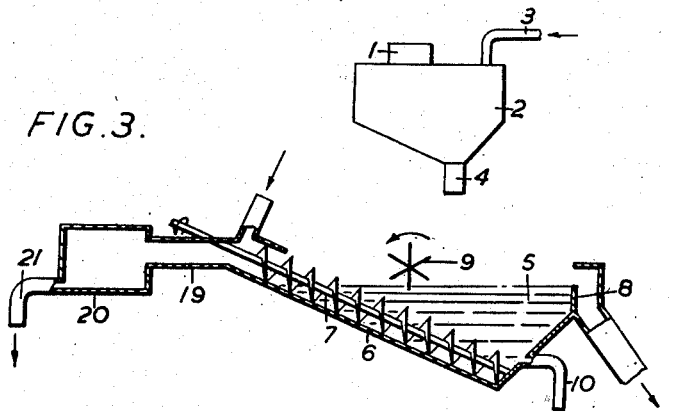
Figure 3 is a diagrammatic representation of a further modification of the plant.

Thus, referring to Figure 2, a second separating vessel 11 is provided, similar to vessel 5 except that it contains hot water, preferably maintained at a temperature of from 70–95° C. by steam provided at a suitable rate through pipe 14. The bone discharged from vessel 5 by worm conveyor 7 is allowed to fall through the hot water to the bottom 12 of the vessel 11, from which it is again removed by a worm conveyor 13. I have found it advantageous to spray the bone in the conveyor with hot water fed through pipe 15 at or above the point where it emerges above the level of the hot water in vessel 11.

The vessel 11 is preferably so arranged and the speed of the worm conveyor so adjusted as to allow the bone to be in contact with the hot water for a period of about 2 minutes.

A further quantity of fat will be found to separate as liquid fat on the surface of the hot water, from which it may be removed by flowing over weir 17, while the paddle 16 keeps the fat away from the bone. Surplus hot water is removed from the vessel 11 by means of pipe 18.

I have found that the fat recovery can be further improved and the fat content of the ground bone still further reduced by arranging for the bone to be vigorously agitated for a short time with the hot water in the vessel 11, before it is allowed to settle prior to removal from the vessel. In this case it may be convenient to provide a plurality of vessels 11 into which the material from vessel 5 can be discharged, so that while the bone is settling, after agitation in one vessel 11, it is being discharged into and agitated in another.

Water taken off through pipes 10 and/or 18 may be passed over separating pits to remove any fat and returned to pulverizer 1 together with fresh water by means of a pump (not shown).

In a further modification (Figure 3) the bone discharged from vessel 5 is passed together with cold water through pipe 19 to a centrifugal pump 20, to remove further bloody matter remaining in the bone as well as further traces of fat. In this case the material from pump 20 is preferably discharged through pipe 21 into a second cold-water vessel similar to vessel 5, which delivers some further fat as a scum on the water, and a ground bone, the fat content of which is somewhat lower than that of the bone discharged from the vessel 5. This bone may then be treated in a hot vessel similar to vessel 11 (Figure 2) when a further small quantity of fat will be recovered and the resulting bone will be found to contain between 1 and 2% of fat.

Instead of or in addition to passing the material from the vessel 5 through a centrifugal pump, I may subject it to one or more further treatments with cold water in a hammer mill, which may be of a type similar to that referred to above, or of other suitable design. Where, however, the bone is to be treated more than once in a hammer mill, the grids used in the mill or mills should preferably be of a larger size, say, about ½ inch (1.27 cm.), to prevent the degreased bone from becoming too fine. In general, however, I prefer always to subject the bone to a treatment in a cold separating vessel after each treatment in the mill and to final treatment in a hot vessel.

It has been found in the case of a ground bone discharged from vessel 5 (after one mill treatment) with a fat content of 3.6%, calculated on its dry weight, this fat content was reduced to 1.8% after a second treatment in the mill followed by separation in a cold vessel and to about 0.5% after a third such treatment.

For the further understanding of the invention, the following details of a typical trial of the present process are given by way of example only:

30 cwts. (1524 kg.) of fresh butcher bones (containing from 15–16% by weight of fat) were crushed to pieces of from 1–2 inches (2.5–5 cm.) in size and continuously fed at the rate of 10 cwts. (508 kg.) per hour to a Christy and Norris No. 2½ swing beater mill, fitted with ¼" (6.35 mm.) grids at the discharge outlet, rotating at a speed of 2,400 R. P. M. and continuously flushed by means of a pump with cold water circulating at the rate of 1,000 gallons (4550 litres) per hour.

The ground bone and water were discharged through the grids into a separating vessel containing cold water, from the bottom of which it was continuously removed by a worm conveyor to the second separating vessel containing hot water, the temperature of which was maintained at 85° C. From this vessel the bones were discharged again continuously by a worm conveyor for subsequent processing.

The water supply for the mill was arranged as a closed circuit while the overflow of the water containing traces of fat and solid matter went finally to settling tanks. This overflow is made up by the amount of water used as a spray to wash the bone and also float off the fat in the separating vessels.

The bones discharged from the first separating vessel had a fat content of 4.4% (calculated on dry weight), while the degreased bones discharged from the second separating vessel had a fat content of 1.74% (calculated on dry weight).

The fat recovered in the trial was 12.5% on raw material, and it was all of high quality and excellent in appearance and test. This fat output could be increased by about 2% on the bones by recovering the fat from the solid matter and a mixture of water and fat collected from the settling tanks.

I have found that, as a result of the degreasing operation being carried out wholly or mainly with cold water and requiring only a short time, the process according to the invention gives rise to a bone which has been substantially degreased and the collagen of which is substantially unchanged. Degreased bones prepared by hitherto known methods suffer from the disadvantage that at least a part of the collagen is changed or degraded and a degreased bone, the collagen of which is substantially unchanged (i. e., undegraded) is a new product. The new product is more convenient for glue fanufacture than bones degreased by hitherto known methods and is also superior for use in the preparation of feeding stuffs or fertilizers. The fat content of bones degreased by the method according to the invention varies according to the particular method of operation used, but in general I find that where a single cold water-containing separating vessel is used the fat content of the degreased bone is less than 5%; when a hot water-containing separating vessel is used in addition, the fat content of the degreased bone is less than 2.5% and usually less than 2%. The separated fat is also found to be superior to that obtained by the hitherto known methods of degreasing bones.

Very similar apparatus can be employed in the process as applied to soft fat products. Referring to Figure 4, the soft fat products are fed continuously to the inlet 1 of any suitable high speed pulverizer or hammer mill 2, which may be of the same type described with respect to Figures 1 to 3 and in which they can be subjected to the membrane-rupturing force in the presence of a substantial volume of rapidly moving water fed through pipe 3. I have found that a Christy and Norris No. 2½ standard type swing beater mill, fitted with ¼" (6.35 mm.) grids (not shown), at its discharge outlet and rotating at a speed of about 2,500 R. P. M. and continuously flushed, as for example by means of a pump, with cold water at the rate of 400 gallons (1820 litres) per hour, gives excellent results when continuously fed with the soft fat products at the rate of 30 cwts. (508 kg.) per hour.

The grids should be so chosen as to retain the material for long enough to enable the membranes to be broken, but in general I have found the stated size to be suitable.

The mill is arranged to discharge its contents through pipe 4 into a separating vessel 22, containing cold water. Any solid residues are allowed to fall to the inclined bottom 23 of vessel 22, where they accumulate over the outlet 24, from which they can be removed by washing as desired. The fat associated with water which separates on the surface of the water and which may contain fibrous tissue is removed, either continuously or discontinuously, by means of weir 25. The water is removed continuously by means of a siphon pipe 26 arranged as low as possible in the vessel so as to allow sufficient height of water for the fat to separate while at the same time being clear of the sludge level; the water may either be returned to the mill or run to drain. The rate of flow of the fat-water foam over the weir 25 is adjusted by altering the height of the siphon pipe 26.

Where it is desired to remove the solid residues continuously from the separating vessel 22, the arrangement shown in Figure 5 may be used in which the solid residues are continuously removed by means of a worm 27.

An alternative arrangement by which the said residues are continuously removed and the water from the separating vessel is returned to the mill 2 is shown in Figure 6; in this embodiment a pump 28 is provided which draws water from the vessel 22 by means of pipe 29 and feeds it to the mill, which in turn discharges the treated products and water to the settling vessel 22 which is supplied with fresh water through pipe 30 to keep a flow of water and separated fat flowing over the weir 25. In this case I prefer to provide one or more vertically disposed baffles 31 in the vessel 22, leaving a clearance 32 at or near the lower end, and to arrange for the mill to discharge into one of the compartments thus formed while the feed for the pump 28 is taken through the pipe 29 from that compartment which contains the clearest water. This ensures that the feed-water for the pump 28 will be fairly free of solid matter, which will mainly collect in the other compartment.

If the separated fat is heated to about 94–98° C. and allowed to settle, it will be found that clear fat separates as an upper layer on the water. The lower, or water, layer contains very little fat, which is easily recoverable if desired, but some solid matter, mainly of a protein nature, settles out and can be recovered and used.

If the solid residues recovered either from the fat-water mixture or the separating vessel should be found to contain more fat than may be desired, they may be recirculated through the mill with more water and allowed to settle again; alternatively they may be dropped into and/or agitated with hot water and allowed to settle again, in order to facilitate the separation of more fat. As a still further alternative, these solids may be centrifuged either in their wet form as obtained or while being sprayed with steam or hot water.

The solids obtained as a result of the present process will be found to have a low fat content, and they may be dried and utilized for any suitable purpose such, for example, as the preparation of feeding stuffs and/or fertilizers.

It will be understood that the foregoing description is given by way of example only and that various modifications may be made without departing from the scope of the invention. Thus, for example, the solid residues at the bottom of the separating vessel, which can be of any suitable design, may be removed in continuous or discontinuous manner.

The following details of some of the results obtained, which are given only as illustrations, will serve further to explain the nature of the invention:

I have found that a good quality suet, when treated according to the present process and subjected to one settling operation in cold water, yielded 85% by weight of the suet in the form of edible fat. The loss in the cold water used in the mill for grinding and circulation was small, but the small quantity of fat present in the water could easily be recovered by normal methods such as by heating and acid treatment or by treatment in a conventional, continuous centrifugal separator.

In the case of a sample of meat and fat, it was found that the yield of fat was 20% calculated on the weight of the meat, while the solid residues represented 14% of the weight of the original meat, and these residues after a single cold treatment were found to contain 25% of fat, calculated on the dry weight of the residue. This fat content could be further reduced by a further circulation of the residue through the mill followed by a settling in cold water, or by a treatment in hot water as described above.

The following is an example of a typical test run using the present process:

20 cwts. (1016 kg.) of raw material, consisting of beef suet and mutton suet, were continuously fed at the rate of 12 cwts. (610 kg.) per hour to a Christy and Norris No. 2½ swing beater mill fitted with ¼" (6.35 mm.) grids at the discharge outlet rotating at a speed of 2,400 R. P. M. and continuously flushed by means of a pump with cold water at a rate of 600 gallons (2730 litres) per hour.

The ground material and water were discharged through the grid into a separating vessel where the fat was recovered from the readily separable mixture of fat and water.

The fat recovered in this trial was 86.2% by weight based on the raw material, and it was all of high quality and titre and excellent in color and odor.

Figure 7 illustrates a more complete plant which may be employed to continuously recover fat from either bones or soft fat products. In treating bones, the bones as they come from the butcher or other source of supply may be delivered onto the belt conveyor 33 at a proper rate to supply the process and thereby fed into an apparatus 34 of any known or suitable type for reducing the bones to a size suitable for feeding into a hammer mill.

This apparatus is preferably of the type which will crush or shear the bones into pieces ranging from 1 to 2 inches in size. The crushed bones discharged from the crushing apparatus may be received on a belt conveyor 35 and delivered thereby into the feed chute 36 of a hammer mill 37. A stream of fresh water, or water returned from subsequent steps of the process, or a mixture of both, may be simultaneously delivered into the feed chute 36 through a pipe or conduit 38 in an amount which is several times the weight of bones fed in an equal time.

The hammer mill 37 may be of a conventional type except as discussed below and may have a substantially cylindrical casing 38', in which is positioned a rotor 39 having its axis parallel to the axis of the casing. The rotor may include a plurality of discs 40, one of which is shown in Figure 7, secured concentrically on a driving shaft and having pivoted thereto a plurality of hammers 41. The pivoted connection of the hammers to the discs is merely for the purpose of preventing breakage in the case of clogging of the mill or accidental feeding of metal or other non-disintegrable material, since hammers rigid with the rotor are entirely operative. The hammers will usually be relatively narrow, i. e., have a dimension axially of the rotor of the order of ½ to 1 inch, and the ends of the hammers will ordinarily be spaced a substantial distance from the inner periphery of the mill, for example, 1 inch in the case of a mill having a casing with a 2 foot diameter. A large mill will usually have a plurality of axially spaced circumferentially arranged rows of hammers and the roughly crushed pieces of bone, when they enter the hammer mill casing through the chute 36, are subjected to intense impacts by the hammer while they are surrounded by the relatively large amount of water fed simultaneously therewith. For example, with a rotor having a 22-inch diameter measured between the outer ends of the hammers and a rotor speed of 2,500 R. P. M., the ends of the hammers are traveling at a linear speed of approximately 14,400 feet per minute. The pieces of bone are thus suddenly accelerated from a low velocity to a high velocity by a suddenly applied impact or percussive blow and thrown against the breaker block 43, where they are again subjected to impacts causing retardation or change of direction of the pieces.

The linear speed of the hammers can be varied over a considerable range, for example, the mill referred to above operates satisfactorily though at reduced capacity at a rotor speed of 1,000 R. P. M., i. e., a linear speed of the ends of the hammers of approximately 5,600 feet per minute. The upper limit of linear speed of the ends of the hammers is apparently set by the mechanical strength limitations of the mill, and it is preferred to operate the mill at the highest speed at which it will run without rapid deterioration or destruction, since throughput increases with rotor speed. Practical considerations, however, dictate a maximum linear speed of impact to the neighborhood of 20,000 feet per minute. The useful range of linear speed of impact would, therefore, appear to be between approximately 5,000 and 20,000 feet per minute for a mill of the type described and will be of that order for any type of impact apparatus useful in the present invention.

The roughly crushed bones are broken into smaller pieces by the impacts they are subjected to in the mill. The lower portion of the cylindrical casing of the mill is made up of a grid 44 which may be formed of axially extending bars circumferentially spaced from each other to provide openings for escape of the bone particles. A suitable spacing between the bars has been found to be about ¼ inch, i. e., between approximately ⅛ and ½ inch, and bone particles having a size corresponding to the openings in the grid or smaller are immediately discharged from the mill. Larger sized particles are carried around the mill and repeatedly subjected to collisions with the casing and blows by the hammers until reduced to a sufficiently small size to be discharged through the grid.

Bones contain relatively large pieces of tendon, however, and may contain pieces of skin, etc., which are not broken up in the hammer mill. As shown by the dash lines in Figure 8, the chute 36 may enter the mill at one end thereof, and at the other end of the mill a relatively large opening 45, for example, an opening 4 by 6 inches, may be provided for escape of the larger pieces referred to. In general, the bone itself is reduced to pieces or particles ¼ inch in greatest dimension or less, but some larger pieces of bone find their way through the opening 45. Such large pieces, however, are substantially free of grease, and it is apparent that it is not the reduction in size of the bone pieces which is the primary cause of the grease-releasing action of the mill. Indeed, it is definitely disadvantageous to reduce the size of the bone particles to very small dimensions, for example, cell size, as the resultant larger surface area of the bones causes the retention of a relatively large proportion of fat by adherence to the surfaces of the bones. Preferably the particle size of the degreased bone is of the order of ¼ inch.

It has been found that the presence of a relatively large amount of water is necessary for effective removal of grease from bones. In the absence of water, the grease is not separated from the bones. Also bones containing a substantial amount of fat cannot be disintegrated in a hammer mill or other type of impact mill in the absence of water as a practical matter, since the mill clogs, and very large amounts of power, in practice unobtainable, are required to operate the mill. Grease-containing bones have substantial resiliency and are difficult to shatter by impact blows. Apparently, the inertia of the water surrounding the pieces of bone adds to the inertia of the pieces to enable effective application of the impact forces.

When water is introduced into the hammer mill, with the bones, the amount of power required to drive the rotor for a given rate of feeding bones remains high until the amount of water approaches 3 to 5 times the weight of the bones. As the amount of water is increased from approximately this amount to approximately 7 times the weight of the bones, the amount of power to drive the rotor continues to decrease. As the amount of water is further increased above about 7 times the weight of the bones, the power required to drive the rotor remains fairly constant up to a condition where the amount of water is approximately 30 times the weight of the bones. The operative range of amount of water is, therefore, approximately 3 and 30 times the weight of the bones, and the range of practical operation is between approximately 5 and 15 times the weight of the bones, the preferred amount being about 7 times the weight of the bones. For example, very satisfactory operation has been obtained with a 24" by 24" hammer mill of the type above described having a rotor diameter of 22" between the ends of the hammers, when the rotor was driven at 2,500 R. P. M. and the feed was 2 long tons (2032 kg.) of raw bone per hour and 3,000 gallons (13,650 litres) of water per hour. This provided a linear speed of the ends of the hammers of approximately 14,400 feet per minute. The weight of water fed to the mill in a given time was approximately 6.8 times the weight of bones.

The pieces of bone discharged from the mill, after being allowed to settle in water, show that the fat cells which were present in the interior of the bones have been ruptured and the grease substantially completely removed therefrom. The intense impacts to which the bones are subjected have apparently ejected the grease with violence from the bone cells into the water such that this grease remains suspended in the water and does not adhere to the bone pieces. The scrubbing action of the water upon the bone pieces due to its vigorous movement through the mill and the movement of the pieces through the water caused by the hammer blows thereon also assists in removing the grease from the bones. The pieces of bone discharged through the grid 44 as well as any large pieces of sinew or other material discharged through the opening 45 are flushed out of the mill by the vigorously moving stream of water containing the grease in suspension.

The materials passed through the mill are discharged through a conduit 46 into the settling tank 47. The bone pieces as well as any pieces of sinew or skin rapidly settle to the bottom of the tank 47 and are removed by the worm 48. If the water is cold, the grease is not emulsified into the water, so that it rapidly rises to the surface and collects as a thick surface layer of butter-like consistency which is associated with a substantial amount of water and also a small amount of fibrous material. This fibrous material does not, however, enclose particles of the grease since nearly all of the grease may be readily separated therefrom by a simple heating and screening operation as described below.

The paddle wheel 49 prevents the grease from entering the worm 48 so as to prevent it from being removed from the tank 47 with the bone particles. In a commercial plant, it has been found preferable to let the grease and the water in the tank 47 overflow together so that the water carries the thick layer of grease out of the tank 47 and down the discharge chute 50. The discharge chute 50 may empty into a separating tank 51 for separating the grease from the major portion of the water. The grease continues to float upon the surface of the water in the tank 51 in a thick layer and may be removed therefrom by a belt 52 having paddles 53 thereon which scrape the layer of grease from the surface of the water over a weir into a discharge chute 54. The water may be discharged from the lower portion of the tank 51 through a constant level overflow pipe 53' into a discharge funnel 55 along with any small amount of proteinaceous material which may settle in the tank 51.

As stated above, the grease discharged from the tank 51 by the chute 54 is of butter-like consistency and is still associated with a substantial amount of water, i. e., the amount of water may vary from approximately 20% to 60% of the total weight of the grease-water mixture. In order to reduce the amount of water which must be heated when the grease is melted to separate it from the water, the grease is preferably first run through a dewatering mechanism 56. This mechanism may be similar to the squeezing apparatus employed in butter manufacturing to remove excess water from butter and may include a worm (not shown) driven from any suitable source of power through a sprocket 57. Water may be discharged from one end of the apparatus 56 through a conduit 58 into a discharge funnel 59, and grease having its water content substantially reduced may be discharged from the other end of the apparatus from a chute 60. Since the water discharged through the conduit 58 will usually contain a substantial amount of grease, it is advantageously returned to the settling tank 51, as indicated by the dotted line 61, for settling of grease therefrom.

The grease may be discharged from the chute 60 into a heating apparatus 62 which may be of any known or suitable type and is shown, for example, as a horizontal tank provided with an agitator 63 and a steam jacket 64. The agitator 63 may be driven at a relatively low speed just sufficient to ensure that the grease and water mixture delivered into the tank 62 is uniformly heated. The grease containing a small amount of water is heated in the tank 62 to a temperature just above the melting point of the grease and may be delivered through a pipe 65 onto sieve 66. The liquid grease and small amount of contained water passes through the sieve 66 and is collected in a funnel 67 and thereby delivered to a conventional, continuous centrifugal separator 68. The sieve 66 removes fibrous proteinaceous material from the melted grease, and this material may be discharged through the funnel 69. The melted grease is separated from its contained water in the centrifugal separator 68 and discharged as the lighter effluent through a spout 70 into a collecting funnel 71 from which it may be delivered into suitable containers for cooling. A small amount of water is discharged as the heavier effluent through a spout 72 into a discharge funnel 73.

The temperature employed to melt the fat will depend upon the type of fat being recovered from bones or other fat-containing material and need not be higher than that required to just render the fat liquid. This heating operation should be carefully distinguished from a rendering operation. In a rendering operation sufficient temperature and time must be employed to break the walls of the fat cells, and in general a long time of treatment or excessively high temperatures must be used both of which deleteriously affect the grease. In the present case, no fat cells exist and the grease is in condition to rapidly separate from the water as soon as the grease is melted.

The bones discharged from the settling tank 47 by the worm 48 will usually contain a small amount of grease superficially adhering thereto. These bones will also contain pieces of tendon and may contain other material, such as pieces of skin, which also settle in the tank 47, and the bones containing such materials are preferably discharged into a second heated settling tank 74. A body of heated water at a temperature just above melting point of the grease is preferably maintained in the tank 74, and any suitable heating means such as steam jackets (not shown) or the introduction of live steam directly into the tank 74 may be employed to maintain such temperature. Thus the water temperature may range from 80 to 95° C. or even to 100° C. The bones and other solids associated therewith rapidly settle in the tank 74 while the grease adhering to the bones is melted and most of it rapidly rises to the water in the tank 74. Water is also introduced into the tank 74 as described below, and this water and the melted fat may be discharged therefrom over a weir and through a spout 75 onto a sieve 76.

Any fibrous or other solid, proteinaceous material, which floats and is carried in the melted grease and water, is retained on the sieve and discharged through the funnel 77. The melted grease and water pass through the sieve 76 and are collected in the funnel 78 and delivered to a settling tank 79. The settled water may be discharged from the settling tank 79 through a constant level overflow pipe 80 into a funnel 81. The melted grease still containing a small amount of water may be discharged from the top of the settling tank through a conduit 82 and delivered thereby to a conventional, continuous centrifugal separator 83. A small amount of water is discharged from the centrifugal separator as the heavier effluent through the spout 84 into a discharge funnel 85, and the melted fat is discharged as the lighter effluent through a spout 86 into the funnel 87 from which it may be delivered into suitable containers for cooling. While the melted fat containing a small amount of water from the tank 79 may be combined with that from the tank 62 and subjected to centrifugal separation in a single separator, it is preferred to keep the fat from the two portions of the process separate. It will be apparent that the fat discharged from the centrifugal separator 68 constitutes the major portion of the fat recovered in the process.

The bones and other materials settling in the tank 74 may be removed therefrom by a worm 88 and a paddle wheel 89 may be empolyed to prevent the fat from entering the worm 88. The bones discharged by the worm 88 are preferably washed by a spray of heated water delivered from a spray head 90 positioned over the discharge end of the worm 88. In general the bones may be put through the entire process except for drying in a few minutes, for example, 2 to 6 minutes so that the bones are subjected to hot water treatment for a short time only, for example, 1 to 3 minutes. The bones removed from the tank 74 by the worm 88 will contain less than 2.5% grease and usually less than 2% grease on a dry basis but will be wet and still have considerable water adhering thereto. These bones may be discharged onto a shaker screen 91 so as to remove adherent water therefrom, which water may be collected in a funnel 91'. This water will usually contain a small amount of bone and is advantageously returned to the tank 74 as indicated by the dashed line 92.

The bone and other material associated therewith progress down the screen 91 and may be delivered into a drying apparatus 92'. The drying apparatus 92' may be of any known or suitable type, one suitable type being a large drum containing an agitator with a plurality of rabble arms (not shown) driven from any source of power through a pulley 93. A suitable drying gas, such as heated air or products of combustion may be introduced into the dryer through a conduit 94 and gas and water vapor discharged through a conduit 95. The dried bones which have preferably not been heated above 60° C. in the dryer may be discharged from the dryer and from the process through a conduit 96.

While the settling tanks 47 and 74 may be of the type shown in Figure 7, in which the bones are removed from one end and the grease from the other, a preferred type of settling tank for separating the bones from the fat and water is diagrammatically illustrated in Figures 9 and 10. The tank 97 shown in these figures has a semi-circular end 98 with a flat, inclined bottom portion 98' and has its discharge worm 99 positioned at one side of the tank with a dividing partition 100 between the worm and the main portion of the tank. The position of the conduit 101 directly over the worm 99, for delivering material to be separated in the tank, is shown in Figure 10 and by dash lines in Figure 9. The paddle wheel 102 is also positioned directly over the worm. The tank has its maximum depth at 103 and the bottom portion thereof slopes upwardly to the discharge weir 104 over which the fat and water or melted fat overflows into the discharge chute 105.

The water discharged through the funnels 73, 81 and 85 will usually be sent to waste as this water is small in amount and contains very little total fat and solubles. The water discharged from the tank 51 through the funnel 55 constitutes the major portion of the water employed in the process and is advantageously reused. It contains a small amount of fat and a small amount of solid protein in suspension. It, however, contains a substantial amount of solubles, for example, blood albumin and other soluble proteins. The solid protein may be removed by passing the water through a sieve, and most of the fat can be removed and recovered by further settling. Also the major portion of the solubles can be removed and recovered by steps which are not a part of the present invention, and the thus purified water can be returned to the mill 37 through the pipe 38 to reduce the amount of fresh water required. It is apparent that the present process is entirely operative, whether the water supplied to the mill is entirely fresh water or partly recycled water; and in this connection it should be mentioned that the water supply to the mill need not be through the chute 36 through which the bones are fed but may be through a separate conduit.

The fibrous proteinaceous material separated from the melted fat by the sieves 66 and 67, as well as any similar material separated from the water discharged from the settling tank 51 through the funnel 55, may be collected and dried in any desired manner and constitutes a valuable product. This material is predominantly protein but such material, particularly that from the screens 66 and 76, contains a substantial amount of fat, i. e., up to 45% calculated on the weight of the fibrous material. The total weight of such fibrous material is very small compared to the weight of fat otherwise recovered in the process such that the loss of fat is also very small. That is to say, nearly all of the fat separates from the fibrous material.

The bones discharged from the process have their collagen content undamaged and contain substantially all of the colagen orginally present in the bones. This is in sharp contrast to all previous processes for the recovery of fat from bones. The periosteum adhering to the bone particles as well as the pieces of tendon adhering to or separate from the bones constitute the main glue-making or collagen-containing materials and are substantially in the condition found in fresh bones. On the contrary, the wet or dry rendering processes substantially completely destroy the collagen and even the solvent extraction processes result in very substantial losses of collagen, and the recovered collagen is in a degraded condition. Aside from employing the bones as glue-making materials, the bones are of much higher quality for other uses since they have a much higher nitrogen content than the bones from previously employed rendering processes. Higher quality bone meals for either feeding or fertilizer purposes can, therefore, be produced from the bones. Also, the fat content of the bones can be reduced as low as 0.5 by weight by the process and will not exceed 2.5% when the bones are subjected to the heated water treatment described above. The fat content of the bones is, therefore, sufficiently low that rancidity problems are not encountered upon storage of bone meal made therefrom. Bone meal made from bones containing more than 3% fat such as the bones from dry rendering processes rapidly develop an offensive odor upon storage.

The grease recovery is much higher than that from wet rendering or dry rendering process and is comparable with that from solvent recovery processes. The recovered grease is of much higher quality, the grease from fresh butcher bones being almost white and having a sweet odor, whereas the grease from dry rendering processes using the same raw material is extremely dark in color and has an offensive odor, and the grease from solvent recovery process is of still lower grade. The free fatty acid content of the recovered grease is much lower than that of prior rendering processes and the titre and bleachability is substantially improved.

For purposes of comparison between the present process and the conventionally employed dry rendering process, the following represent approximately the minimum results of a well conducted process in accordance with the present invention and approximately the maximum results of dry rendering processes. In both cases, the raw materials are fresh butcher bones containing 15% fat by weight on the raw bones.

*Comparison of yields*

|  | Present Process | Dry Rendering |
|---|---|---|
|  | Percent | Percent |
| Tallow recovered (by weight on raw bones) | 13 | 10 |
| Degreased bone (by weight on raw bones) | 55 | 55 |
| Loss in Process (Moisture, fat, protein, etc., by weight on raw bones) | 32 | 35 |
|  | 100 | 100 |
| Protein yield in bones (by weight on raw bones) | 19.25 | 16.83 |

*Comparison of recovered bone quality*

|  | Present Process | Dry Rendering |
|---|---|---|
|  | Percent | Percent |
| Fat content (by weight on dry bones) | 2 | 6 |
| Protein content (by weight on dry bones) | 35 | 30.6 |

*Comparison of recovered tallow quality*

|  | Present Process | Dry Rendering |
|---|---|---|
| Titre | 41.1 | 40 |
| Free fatty acids (by weight on dry fat), percent | 2.3 | 8 |
| F. A. C. color | 3 | 25 |
| Moisture, Insolubles and Unsaponifiables (by weight on dry fat), percent | 0.3 | 1.5 |
| Odor | Sweet | Bone |

For purposes of comparison fresh butcher bones predominantly beef bones have been selected, but similar comparisons can be made for any other types of bones containing grease including bones from other types of animals, usually handled in butcher shops, such as sheep, goats and hogs. Bones from other animals, such as horse bones, whale bones, etc., are also suitable sources of supply for the present process. The quality and type of grease recovered will of course depend upon the freshness of the bones and the type of animal from which the bones are obtained, but in general a high yield of grease of higher quality than that from prior processes is obtained. Substantially the same considerations apply to the recovery of fat from soft fat products. That is to say, the process is applicable to substantially all soft fat products, such as beef, mutton, and pork products, whale blubber, etc., and again the quality of fat will depend upon the freshness and type of supply material.

In employing the apparatus of Figure 7 for recovering fat from soft fat products, the bone crushing apparatus 34 may be omitted. That is to say, a plant employed for both purposes, can have the soft fat products delivered onto the conveyor 35 in pieces of substantial size so long as the pieces are small enough to enter the hammer mill 37 through the chute 36. In general, the conditions of operation of the hammer mill and the amount of water fed thereto, on the basis of the weight of the material being fed, are substantially the same as in the case of recovering fat from bones. That is to say, the amount of water may range from 3 to 30 times the weight of the soft fat and, preferably from 5 to 15 times the weight of the soft fat. In the hammer mill, the soft fat products are subjected to the intense impacts above described while suspended in or surrounded by water, and it appears that the connective tissue enclosing the fat to form the fat cells is violently torn out of the soft fat products to rupture the cells and leave the fat suspended in the water. Again, the fat, after the contents of the mill are discharged into the settling tank 47, rapidly rises to the surface of the water in the form of a thick butter-like layer associated with a substantial amount of water. Also, the fat layer from soft fat products may contain considerably more fibrous material than is the case when bones are being treated, although when treating high quality soft fat products, such as suet, substantially no fibrous material appears in the fat discharged from the settling tank 51. Even when present, the fibrous material does not enclose the fat, and a simple heating step will enable nearly all of the melted fat to be readily separated from the fibrous material. The fatty layer discharged from the settling tank 51 may be treated in the same manner as described above, with respect to the process applied to bones. The fat is not damaged in any way in the process, and the recovered fat is of as high quality as that in the raw material. That is to say, if the raw material is of edible grade, the recovered fat is a high quality edible fat having a high titre, a low free fatty acid content and low color and odor.

Any material collecting in the bottom of the settling tank 47 may be removed by the worm 48 and this material may be directly discharged from the process or additional fat can be recovered therefrom by subjecting it to a short time treatment in heated water in the settling tank 75. The residual material may be dried in any suitable manner and constitutes an excellent material for feeding meals or fertilizers.

In any of the modifications of the processes described above, it is preferred to employ water which is at a temperature substantially below the melting temperature of the fat in the mill and in the settling vessels in which the fat is initially separated from the major portion of the water and from the residues of the fat-containing materials. That is to say, the temperature of the water in the preferred operation may vary from just above the freezing temperature to just below a temperature which will melt the fat. Thus water at the ordinary temperatures of natural sources or of municipal water supplies or water at room temperature are satisfactory. Such water is referred to herein as cold water as distinguished from water substantially above room temperature, i. e., above 25° C. This enables a high recovery of a fat of soft butter-like consistence which may, if desired, be worked to remove a portion of the water associated with the fat before the fat is melted. The advantage of being able to employ water at the temperature of usual sources of supply is apparent, as expensive heating of the water is thereby avoided and the only water it is necessary to heat is a small amount used to wash the bones or other residual products after the initial separation of the fat and the small amount of water contained in the fat during melting thereof.

So far as actual operativeness of the process, however, it is possible to employ water at a temperature above the melting point of the fat up to approximately the boiling point of water in the mill and in the initial separating steps. By so doing an effective separation of fat from the bones or other fat-containing material and from the water can be obtained in a single settling operation. That is to say, the fat is melted as rapidly as it is released from the bones or other fat products and is scrubbed clearly therefrom by the relatively moving heated water. No subsequent washing operation of the bones or other residual material is required to reduce their fat content to a low value and the separated melted fat requires only clarification. The disadvantage of such process is, however, the expense of heating the large amount of water required during impact treatment of the fat-containing material and this disadvantage will ordinarily outweigh the advantages of eliminating the other steps of the preferred process. The process employing heated water does, however, have important advantages over prior fat recovery processes in that a higher recovery of higher quality fat is obtained and in the case of treating bones, a higher nitrogen content and an undamaged collagen content is obtained. One reason is that the materials are subjected to the hot water for a brief period of time only, for example, 1 to 3 minutes and the temperature does not exceed the boiling point of water.

One of the important features of the invention appears to be that the fat cells of either bones or soft fat products are ruptured mechanically by percussive blows or intense impacts, while freely suspended in or surrounded by water so that the impacts not only rupture the fat cells but forcibly eject the fat therefrom into the surrounding water. The resulting relative movement between the fat-containing material and the water also appears to scrub the fat therefrom. The fat is thus mechanically separated from the bone cells and connective tissue of either the bones or the soft fat products and is substantially prevented from adhering thereto by intervening water films. While the hammer mill above described is a convenient and effective way of providing the impact treatment and is a commercially available device, it is entirely possible to accomplish the same result with various apparatus. For example, instead of employing moving hammers to strike the relatively stationary pieces of fat-containing material while surrounded by water, the pieces of fat-containing material along with the requisite amount of water can be fed to the interior of a rapidly rotating centrifugal thrower and violently thrown therefrom through radial passages against stationary or reversely moving projecting elements or bars so as to produce the intense impacts and the relative movement with respect to the water.

The impact treatment while the material is suspended in or surrounded by water is to be distinguished from processes involving grinding, slicing or pounding treatments in which the material is compressed or sheared between two or more elements or surfaces irrespective of whether water is present. In such treatments the fat is smeared onto or pressed into the non-fat material and is difficultly separated therefrom even though a majority of the fat cells may be broken. The treatment of the present invention is also to be distinguished from operations merely involving agitation of the fat-containing materials in water, either with or without heating. In such operations, if the agitation is sufficient to rupture the fat cells and release the fat, it also produces a difficultly separable tight emulsion between the fat and water.

Although the fat and water is subjected to considerable agitation in the impact treatment of the present invention, no emulsion between the water and fat is formed and the fat-containing a relatively small amount of easily separable water quickly separates from the major portion of water when the material discharged from the mill is subjected to settling. The water in the separated fat layer appears to be mostly in the form of films of water surrounding relatively large particles of fat and is not emulsified therein, as a substantial portion of the water can be removed by a mere squeezing operation. While some fibrous material also floats and appears in the fat layer, it does not surround the fat particles, since a mere heating operation with or without a squeezing operation to decrease the water content of the fat layer enables nearly all of the melted fat to be readily separated from the fibrous material. Since the recovered fat is of higher quality and the recovery of fat is greater than that previously obtained in rendering operation and since in the case of treating bones the bones are also of higher nitrogen content and contain substantially all of the collagen of the bones in undamaged condition, it is apparent that I have provided an improved process of recovering fat from animal materials containing fat.

While the process of the present invention was developed for recovery of fat from animal material containing fat, it is apparent that it is applicable to various vegetable materials containing solid or liquid fat. Thus various seeds and beans, such as cotton seed or soyabeans contain liquid fat or oil in cells. The impact treatment of the present invention in the presence of water ruptures such cells and ejects the oil into the water in the same manner as with animal products. The resulting relative movement with respect to the water also scrubs the fat from the residual products so that the fat or oil is suspended in the water and thus separated from the wet residual products. Such oil or fat collects upon the surface of the water during a settling operation with the major portion of the residual substantially fat free material in the lower water layer.

In the above specification and the appended claims, the term "fat" is employed as a generic term to mean either fat which is solid or semi-solid at usual ambient temperatures, or fat which is liquid at such temperatures.

This application is a division of my copending application Serial No. 237,327, filed July 18, 1951, now Patent No. 2,635,104, which in turn is a continuation-in-part of my copending applications Serial Nos. 166,573 and 166,574, both filed June 7, 1950 and both now abandoned.

I claim:

1. Apparatus for recovering fat from cellular fat-containing materials, which comprises, a plurality of impact elements, a casing enclosing said impact elements, means for continuously feeding pieces of said material into said casing, means for continuously feeding into said casing a stream of liquid in an amount at least three times the weight of the fat-containing materials, means for producing relative movement between said pieces of material and said impact elements of approximately 5,000 to 20,000 feet per minute so that the fat-containing cells in said materials are ruptured by intense impacts delivered thereto while surrounded by said liquid thereby to release the fat and scrub the fat from the residues of said pieces by relative movement between said residues and said liquid, a constantly open discharge opening having a grating covering the major portion thereof and provided with openings through which the resulting materials are continuously discharged, a vessel for receiving the resulting materials discharged through said grating, and means for separately delivering residual disintegrated material and a material high in fat content from said vessel.

2. Apparatus for recovering fat from cellular fat-containing materials, which comprises the combination of, a hammer mill having a rotor provided with a plurality of impact elements on the periphery thereof, and a casing for said rotor having an inlet conduit leading into the upper portion thereof and a discharge grating, with means for continuously feeding pieces of said material into said casing through said conduit, means for continuously feeding a stream of water into said casing in an amount several times the weight of the fat-containing materials, said rotor turning at a high speed so that the fat-containing cells in said materials are ruptured by intense impacts delivered thereto while surrounded by water thereby to release the fat and scrub the fat from the residues of said pieces by relative movement between said residues and water, whereby a mixture containing residual disintegrated material and fat suspended in water is continuously discharged from the mill through said grating, a settling vessel receiving the mixture discharged from said mill through said grating, whereby fat collects as an upper layer on the surface of said water, and means for separately delivering said upper layer and said water from said vessel.

3. Apparatus for degreasing bones, which comprises the combination of, a hammer mill having a rotor provided with a plurality of impact elements on the periphery thereof and a casing for said rotor spaced from said impact elements and having an inlet conduit leading into the upper portion thereof and a discharge grating, with means for continuously delivering pieces of said bones into said casing through said conduit into the path of said impact members when said rotor is rotated, means for continuously feeding a stream of water into said casing in an amount several times the weight of the bones, means for rotating said rotor so that the fat-containing cells in said bones are ruptured by intense impacts delivered thereto while surrounded by water thereby to release the fat from said bones and separate the fat from the residues of said bones by relative movement between said residues and water, whereby a mixture of comminuted bone and fat suspended in water is continuously discharged from the mill through said discharge grating a settling vessel receiving the mixture of comminuted bone, water and fat discharged through said grating, whereby said comminuted bone settles in said water and fat collects on the upper surface of said water, and means for separately removing said comminuted bone and fat from the major portion of said water.

4. Apparatus for recovering fat from animal bones containing said fat, which comprises, a plurality of impact elements, a casing enclosing said elements and provided with constantly open inlet and discharge openings, means for continuously feeding pieces of said bones into said casing through said inlet opening, means for simultaneously continuously feeding water into said casing and into contact with the pieces therein at a rate several times the rate of feeding said pieces on a weight basis, means for producing relative movement between said pieces in said casing and said elements of the order of 5,000 to 20,000 feet per minute so that the fat-containing cells in said bones are ruptured by intense impacts delivered thereto while surrounded by water thereby to release the fat and separate the fat from the residues of said bones by relative movement between said residues and said water, said casing having a grating extending across said discharge opening through which the resulting mixture containing said smaller pieces of bone and said fat suspended in water is continuously discharged, a settling vessel receiving the discharged mixture in which said smaller pieces of bone settle in said water and a layer of fatty material collects on the upper surface of said water, a conveyor for removing the settled bone from said vessel, and separate means for discharging said fatty material and water from said vessel.

5. Apparatus for recovering fat from material containing fat in cells in said material, which comprises, the combination of, a hammer mill having a rotor provided with a plurality of impact elements on the periphery thereof, and a casing for said rotor having an inlet conduit connected to the upper portion thereof and a constantly open discharge opening provided with a discharge grating covering the major portion of said opening, said rotor turning at a high speed to impart a linear speed to said impact elements ranging between approximately 5,000 and 20,000 feet per minute, means for continuously feeding pieces of said material into said casing through said conduit and into the paths of said impact elements, means for continuously feeding water into said casing and into contact with the pieces of material therein at a rate several times the rate of feeding of said pieces on a weight basis so that said pieces are subjected to intense impacts while the material is suspended in water whereby the cells in said material are ruptured to release said fat and the fat is scrubbed from the residues of said pieces by relative movement between said residues and said water and a mixture of fat suspended in water and residual cellular material containing water is continuously discharged through said grating, and means for separating said fat and residual cellular material from each other and from the major portion of said water by difference in specific gravities.

6. Apparatus for recovering fat from material containing fat in cells in said material, which comprises, the combination of, a hammer mill having a rotor provided with a plurality of impact elements on the periphery thereof, and a casing for said rotor having an inlet conduit connected to the upper portion thereof and a constantly open discharge opening provided with a discharge grating, means for driving said rotor to impart a linear speed to said impact elements ranging between approximately 5,000 and 20,000 feet per minute, means for continuously feeding pieces of said material into said casing through said conduit and into the paths of said impact elements, means for continuously feeding liquid into said casing and into contact with the pieces of material therein at a rate several times the rate of feeding of said pieces on a weight basis so that said pieces are subjected to intense impacts while surrounded by water whereby the cells in said material are ruptured to release the fat and the fact is scrubbed from the residues of said material by relative movement between said residues and the water and a mixture of fat, liquid and residual cellular material is continuously discharged through said grating, means for receiving the discharged mixture and for separating residual cellular material from the liquid and fat.

References Cited in the file of this patent

UNITED STATES PATENTS

| Number | Name | Date |
| --- | --- | --- |
| 188,429 | Smith | Mar. 13, 1877 |
| 189,541 | Andrew | Apr. 10, 1877 |
| 231,555 | Gastard | Aug. 24, 1880 |
| 287,862 | Robison | Nov. 6, 1883 |
| 668,211 | Powter | Feb. 19, 1901 |
| 2,105,759 | Stevenson | Jan. 18, 1938 |
| 2,189,418 | Finney | Feb. 6, 1940 |
| 2,196,991 | Jacobs et al. | Apr. 16, 1940 |
| 2,281,590 | Newton | May 5, 1942 |
| 2,281,609 | Walter | May 5, 1942 |
| 2,443,274 | Schroeder | June 18, 1948 |
| 2,635,104 | Chayen | Apr. 14, 1953 |

FOREIGN PATENTS

| Number | Country | Date |
| --- | --- | --- |
| 3,357 | Great Britain | 1909 |
| 8,397 | Great Britain | 1912 |